United States Patent [19]

Imamura

[11] Patent Number: 5,172,676
[45] Date of Patent: Dec. 22, 1992

[54] AIR-FUEL RATIO CONTROL APPARATUS IN INTERNAL COMBUSTION ENGINE USING DIFFERENT KINDS OF FUELS

[75] Inventor: Masamichi Imamura, Isesaki, Japan

[73] Assignee: Japan Electronic Control Systems Co., Ltd., Isesaki, Japan

[21] Appl. No.: 778,990

[22] PCT Filed: Mar. 26, 1991

[86] PCT No.: PCT/US91/00390
§ 371 Date: Nov. 14, 1991
§ 102(e) Date: Nov. 14, 1991

[30] Foreign Application Priority Data

Mar. 26, 1990 [JP] Japan .................................. 2-73524

[51] Int. Cl.$^5$ ............................................. F02D 41/14
[52] U.S. Cl. .................................. 123/682; 123/696; 123/1 A
[58] Field of Search ................. 123/682, 696, 1 A, 575

[56] References Cited

U.S. PATENT DOCUMENTS

| | | | |
|---|---|---|---|
| 4,077,364 | 3/1978 | Aoki | 123/682 |
| 4,131,091 | 12/1978 | Asano et al. | 123/696 |
| 4,706,629 | 11/1987 | Wineland et al. | 123/1 A |
| 4,706,630 | 11/1987 | Wineland et al. | 123/1 A |
| 4,967,714 | 11/1990 | Inoue | 123/1 A |

FOREIGN PATENT DOCUMENTS

| | | | |
|---|---|---|---|
| 56-98540 | 8/1981 | Japan . | |
| 62-294739 | 12/1987 | Japan | 123/696 |
| 1-244133 | 9/1989 | Japan . | |

*Primary Examiner*—Andrew M. Dolinar
*Attorney, Agent, or Firm*—Foley & Lardner

[57] ABSTRACT

Disclosed is an air-fuel ratio control apparatus in an internal combustion engine using different kinds of fuels, such as gasoline and an alcohol, interchangeably or together in a mixed state, wherein at the stationary driving, the integration constant for setting the air-fuel ratio feedback correction coefficient at the air-fuel feedback control is set according to the concentration of the basic fuel such as the alcohol, and at the transient driving, the integration constant is set at a value larger than the value set at the stationary driving. If this structure is adopted, the deflection of the air-fuel ratio at the stationary driving is kept constant irrespectively of the fuel concentration and high exhaust gas-purging performances can be maintained, and at the transient driving, a good response characteristic can be maintained to control excessive thickening or thinning of the air-fuel ratio, and good transient driving performances and high exhaust gas-purging performances can be maintained.

13 Claims, 5 Drawing Sheets

AIR-FUEL RATIO CONTROL APPARATUS IN INTERNAL COMBUSTION ENGINE USING DIFFERENT KINDS OF FUELS

TECHNICAL FIELD

The present invention relates to a technique of controlling the air-fuel ratio in an internal combustion engine using different kinds of fuels, for example, gasoline and an alcohol, interchangeably or together in a mixed state.

BACKGROUND ART

In an internal combustion engine using gasoline and an alcohol interchangeably or together in a mixed state, an alcohol sensor is disposed to detect the alcohol concentration and the fuel feed rate is controlled based on the detected alcohol concentration.

As in an internal combustion engine using a single fuel, under predetermined conditions, by an $O_2$ sensor, it is judged whether the air-fuel ratio is rich or lean as compared with the target air-fuel ratio (theoretical air-fuel ratio), and the feedback control is performed so that when the air-fuel ratio is reversed from a lean level to a rich level or vice versa, an air-fuel ratio correction coefficient for correcting the basic fuel feed rate is decreased or increased by a proportion constant and the air-fuel ratio is gradually decreased or increased by an integration constant until the air-fuel ratio is reversed again, whereby the air-fuel ratio is brought close to the target air-fuel ratio (see Japanese Unexamined Patent Publication No. 56-98540). Incidentally, as a simple control method, there is known a method in which the air-fuel ratio control is performed only by the integration constant.

Gasoline is different from the alcohol in the absorption reactivity to a ternary catalyst, and this difference results in the following differences of the characteristics at the above-mentioned air-fuel ratio feedback control.

Gasoline is different from the alcohol in the absorption reactivity to a ternary catalyst, and this difference results in the following differences of the characteristics at the above-mentioned air-fuel ratio feedback control.

More specifically, when the comparison is made in the combustion of the same air-fuel ratio, the $O_2$ concentration in a combustion gas of the alcohol is lower (the amount of the portion left in the form of $H_2O$ is larger than the amount of the portion left in the form of $O_2$) than the $O_2$ concentration in a combustion gas of gasoline, and therefore, the amount of the O component retained in the ternary catalyst is lower and when the fuel injection quantity is increased, the oxidation of CO, HC and the like increased in the exhaust gas by the O component in the ternary catalyst is completed in a shorter time than in case of gasoline. In short, the exhaust amounts of CO and HC increase promptly in correspondence to thickening of the air-fuel ratio.

Accordingly, if the integration constant at the above-mentioned air-fuel ratio feedback control is set at a value suitable for the use of a gasoline fuel, the deflection of the air-fuel ratio becomes too large when an alcohol fuel is used, with the result that the exhaust amounts of CO and HC increase.

Therefore, in the case where the alcohol concentration is high, by reducing the integration constant, the deflection of the air-fuel ratio at the air-fuel ratio feedback control in the stationary state can be reduced and hence, the exhaust amounts of CO and HC can be reduced.

However, if the integration constant is merely reduced as mentioned above when the alcohol concentration is high, the response characteristic of the air-fuel ratio of the air-fuel mixture is reduced, at the transient driving, and therefore, the air-fuel ratio becomes excessively rich or lean to increase the exhaust amounts of CO, HC and NOx.

The present invention has been completed under this background, and it is a primary object of the present invention to reduce the exhaust amounts of pollutants such as CO and HC by making the deflection of the air-fuel ratio during the air-fuel ratio feedback control in a stationary state constant irrespectively of the fuel concentration.

Another object of the present invention is to maintain a good response characteristic during the air-fuel ratio feedback control in a transient state and prevent the air-fuel ratio from becoming too rich or too lean while keeping a good transient state, and to prevent the increase of the exhaust amounts of pollutants such as CO, HC and NOx.

Still another object of the present invention is to attain the abovementioned effects only by software processing without increase of the cost.

A further object of the present invention is to provide an air-fuel control apparatus especially suitable for an internal combustion engine in which an alcohol and gasoline are used interchangeably or together in a mixed state.

DISCLOSURE OF THE INVENTION

In accordance with the present invention, these objects can be attained by an air-fuel control apparatus in an internal combustion engine using different kinds of fuels, which comprises driving state-detecting means for detecting the driving state of an internal combustion engine where different kinds of fuels are used interchangeably or together in a mixed state, air-fuel ratio-detecting means for detecting the air-fuel ratio of an air fuel mixture to be fed into the engine, air-fuel ratio feedback correction coefficient-setting means for setting an air-fuel feedback correction coefficient according to the air-fuel ratio detected by the air-fuel ratio-detecting means by a control including an integration constant so that the air-fuel ratio is brought close to a target air-fuel ratio basic fuel feed rate-setting means for setting a basic fuel feed rate according to the driving state of the engine detected by the driving state-detecting means fuel feed rate-setting means for setting a fuel feed rate corresponding to the target air-fuel ratio by correcting the basic fuel feed rate set by the basic fuel feed rate-setting means according to the air-fuel ratio feedback correction coefficient set by the air-fuel ratio feedback correction coefficient, fuel-feeding means for feeding a fuel to the engine according to the set feed rate, and a ternary catalyst disposed in an exhaust path of the engine to purge pollutants in an exhaust gas by oxidation reaction and reduction reaction, said air-fuel ratio apparatus being characterized by further comprising fuel concentration-detecting means for detecting the concentration of a basic fuel in the used fuels, stationary/transient state-judging means for judging a stationary driving state or transient driving state of the engine based on the driving state detected by the driving state-detecting means, stationary driving integration constant-setting means for setting the integration constant according to the fuel concentration detected by the fuel concentration-detecting means when a stationary driving state judged by the stationary/transient state-judging means, and transient driving integration constant-setting means for setting the integration constant at a value larger predetermined conditions, by an $O_2$ sensor, it is judged whether the air fuel than the value set by the stationary driving integration constant-setting means when a transient driving state is judged by the stationary/transient state-judging means.

In the above-mentioned structure, the concentration of the basic fuel in the used fuels is detected by the fuel concentration-detecting means, and simultaneously, the driving state of the engine is detected by the driving state-detecting means and the air-fuel ratio of the air-fuel mixture is detected by the air-fuel ratio-detecting means.

The basic fuel feed rate set by the basic fuel feed rate-setting means is corrected and set by the fuel feed rate-setting means by using the air-fuel ratio feedback correction coefficient set by the air-fuel ratio feedback correction coefficient-setting means.

By the stationary/transient state-judging means, it is judged whether the driving state is a stationary driving state or a transient driving state.

At the stationary driving where the air-fuel feedback correction coefficient is increased and decreased repeatedly, the stationary driving integration constant-setting means sets the integration constant used in the air-fuel ratio feedback correction coefficient-setting means according to the fuel concentration.

At the transient driving where the air-fuel feedback correction coefficient is increased or decreased continuously, the integration constant is set at a value larger than the value set at the stationary driving by the transient driving integration constant-setting means.

In an engine where, for example, gasoline and an alcohol are used interchangeably or together in a mixed state, if the above-mentioned structure is adopted, by reducing the integration constant with increase of the alcohol concentration in the stationary state, the deflection of the air-fuel ratio can be reduced and the increase of the exhaust amounts of CO and HC can be controlled. Furthermore, by making the integration constant at the transient driving larger than the integration constant in the stationary state, a good response characteristic can be maintained for the air-fuel ratio of the air-fuel mixture, and the exhaust amounts of CO, HC and NOx can be reduced to low levels.

In view of the easiness of setting and judging various factors, it is preferred that the driving state-detecting means should detect the driving state including the revolution speed and load of the engine.

An oxygen sensor for detecting an air-fuel ratio by detecting the oxygen concentration in the exhaust gas of the engine is generally used as the air-fuel ratio-detecting means, and a high reliability is attained.

The air-fuel ratio feedback correction coefficient-setting means can be constructed so that under predetermined conditions, such as partial load conditions, detected by the driving state-detecting means, the air-fuel ratio feedback correction coefficient corresponding to the air-fuel ratio is set, and under other total load conditions, the air-fuel ratio feedback correction coefficient is fixed and the air-fuel ratio feedback control is stopped.

In this case, satisfactory exhaust gas-purging performances can be obtained at the air-fuel ratio feedback control using the air-fuel ratio feedback correction coefficient set according to the air-fuel ratio, and in a higher load region or the like, the air-fuel ratio feedforward control giving a higher output is performed to obtain acceleration performances.

Furthermore, the air-fuel ratio feedback correction coefficient-setting means can be constructed so that the air-fuel ratio feedback correction coefficient is set by proportion-integration control using not only an integration constant but also a proportion constant, whereby the response characteristic can be increased.

In the case where this proportion-integration is carried out, the air-fuel ratio feedback correction coefficient-setting means can be constructed so that the proportion constant is set based on the driving state, whereby the control response characteristic matching with the driving state can be obtained.

The basic fuel feed rate-setting means can be constructed so that the basic fuel feed rate is corrected and set according to the fuel concentration detected by the fuel concentration-detecting means. In this case, since the basic fuel feed rate corresponding to the target air-fuel ratio can be set according to the fuel concentration, the delay of the air-fuel ratio feedback control by a change of the driving state can be sufficiently reduced.

The fuel concentration-detecting means can be constructed so that the concentration of an alcohol as the basic fuel is detected. In this case, a known static capacitance type sensor can be used.

The stationary/transient state-judging means can be constructed so that the stationary driving state and the transient driving state are judged based on driving conditions including the change ratio of the opening degree of a throttle valve. In this case, the judgement can be performed with a good response characteristic.

Furthermore, the stationary/transient state-judging means can be constructed so that when the cumulative revolution number of the engine reaches a predetermined number after the above-mentioned change ratio of the opening degree of the throttle valve has exceeded the predetermined value, the judgement is changed over from the stationary driving to the transient driving. In this case, thickening or thinning of the air-fuel ratio by over shooting can be controlled, as compared with the case where the judgement is changed over to the transient state immediately after the change ratio of the opening degree of the throttle valve exceeds the predetermined value.

Furthermore, the stationary/transient state-judging means can be constructed so that the transient state is judge continuously during a period of from the point of the judgement of the transient driving state to the point of the reversal of increase or decrease of the air-fuel ratio feedback correction coefficient. In this case, a sufficiently good response characteristic can be maintained.

Moreover, the stationary driving integration constant-setting means can be constructed so that the stationary driving integration constant is set by correcting the basic value, set based on the driving state detected by the driving state-detecting means, by the fuel concentration. In this case, high-precision control performances can be obtained well in agreement with the change of the driving state and the change of the alcohol concentration.

EMBODIMENT

Embodiments of the present invention will now be described with reference to the accompanying drawings.

Figure 1:
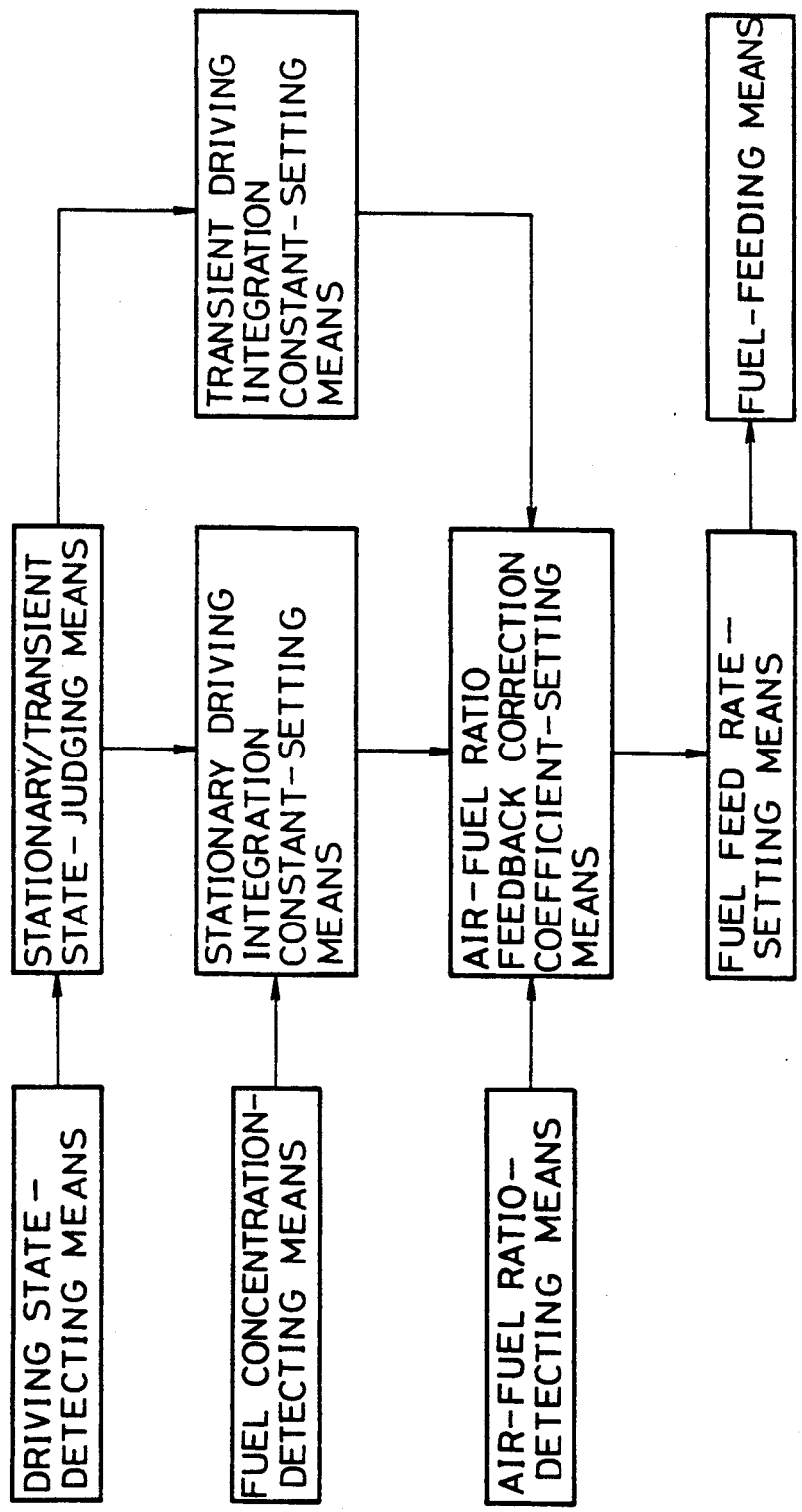
FIG. 1 is a block diagram illustrating the structure of the present invention.
Figure 2:
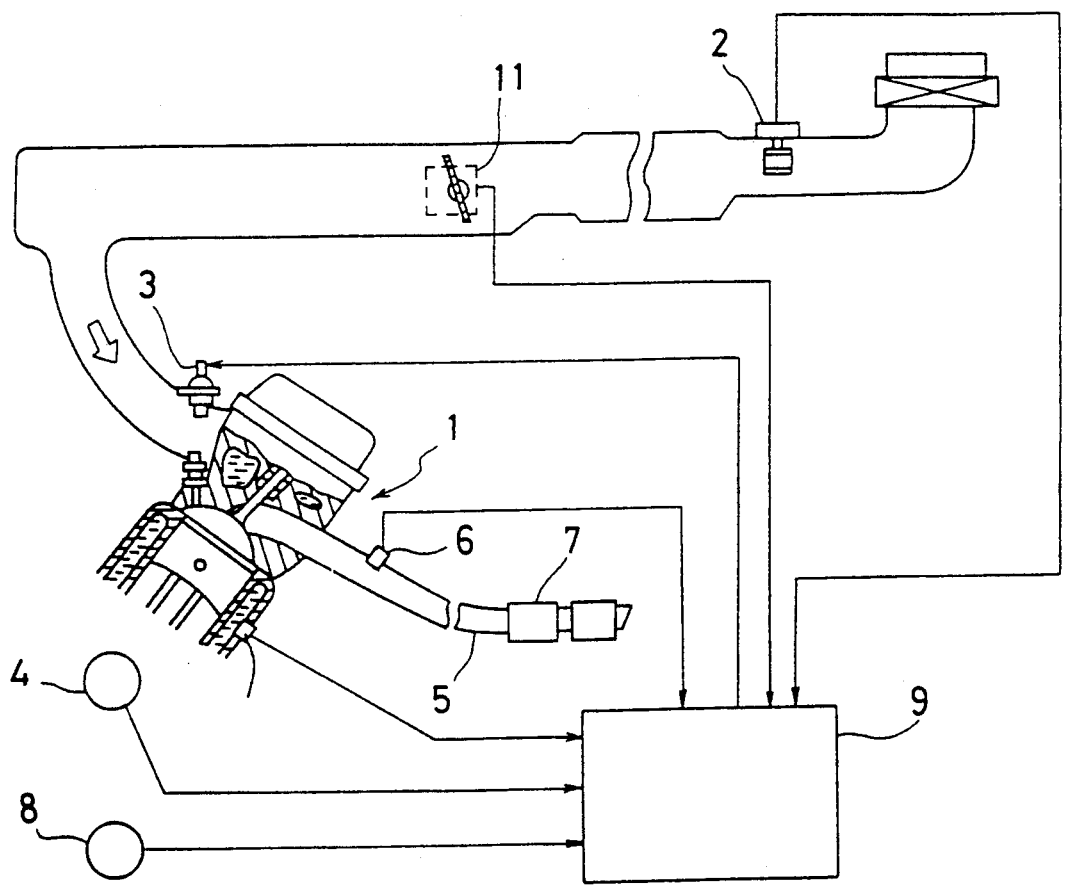
FIG. 2 is a diagram illustrating the system structure of one embodiment of the present invention.

Referring to FIG. 2 illustrating the structure of one embodiment of the present invention, in an internal combustion engine 1 where different kinds of fuels are used interchangeably or together in a mixed state, an air flow meter 2 for detecting an intake air flow quantity, an electromagnetic fuel injection valve 3 as the fuel feed means and a throttle sensor 11 for detecting the opening degree of a throttle valve are arranged in an intake passage, and a crank angle sensor 4 is disposed on a crank shaft or distributor to output a pulse signal at every unit crank angle of the engine 1. In an exhaust passage 5, an $O_2$ sensor 6 is disposed as the air-fuel ratio-detecting means for detecting the air fuel ratio by detecting the oxygen concentration in the exhaust gas, and a ternary catalyst 7 is arranged on the downstream side.

The driving state-detecting means is constructed by the above-mentioned air flow meter 2, throttle sensor 11 and crank angle sensor 4.

To a fuel feed pipe for feeding a fuel to the engine is attached an alcohol sensor 8 as the fuel concentration-detecting means for detecting the concentration of an alcohol as the basic fuel in an alcohol-gasoline mixed fuel flowing in the fuel feed pipe.

Detection signals from these sensors are input in a control unit 9 having a microcomputer built therein, and the control unit 9 computes a fuel injection quantity (fuel feed rate) based on the results of the detection and outputs a fuel injection signal corresponding to the computed value to the fuel injection valve 3, whereby the fuel is injected and fed in an amount corresponding to the computed value to the fuel injection valve 3. Under predetermined driving conditions, the air-fuel ratio feedback control is carried out so that the air-fuel ratio detected by the $O_2$ sensor 6 is brought close to the target air-fuel ratio (theoretical air-fuel ratio).

Figure 3:
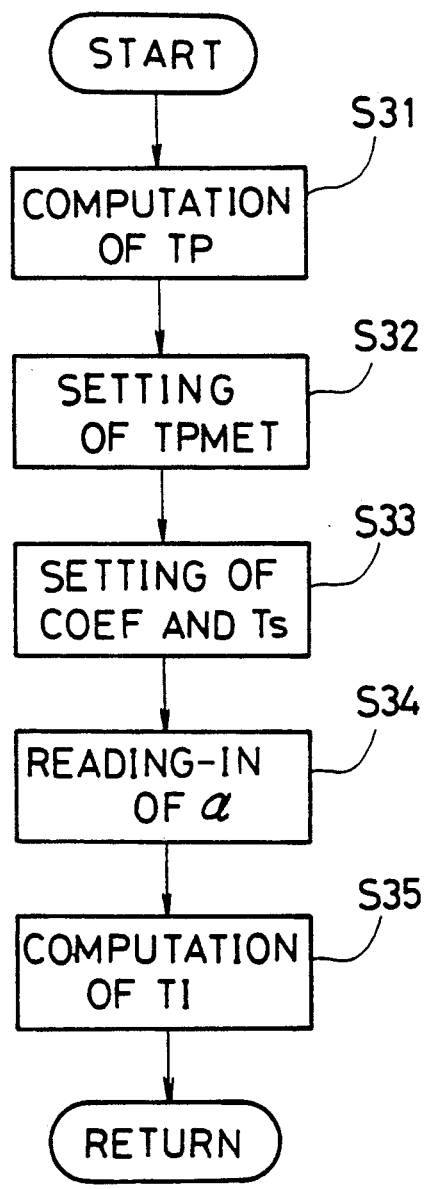
FIG. 3 is a flow chart showing a fuel injection quantity-setting means in the embodiment shown in FIG. 2.

FIG. 3 shows a routine for setting the fuel injection quantity. This routine corresponds to the fuel feed rate setting means.

In the drawings, at step 31 (step is abbreviated as "s" in the drawings), the basic fuel injection quantity $Tp(=K \cdot Q/N;$ K is a constant) is computed based on the engine revolution speed N and the sucked air flow quantity Q. Tp(constant K) is set based on the case where 100% gasoline is used as the fuel.

At step 32, a concentration correction coefficient TPMET for correcting the basic fuel injection quantity Tp is set according to the alcohol concentration set at step 31 by retrieval from a map. The function of correcting and setting the basic fuel injection quantity Tp set at step 31 by using the concentration correction coefficient TPMET corresponds to the basic fuel feed rate-setting means.

At step 33, various correction coefficients COEF based on the cooling water temperature of the engine and the like and the battery voltage correction portion Ts are computed.

At step 34, the air-fuel ratio feedback correction coefficient $\alpha$ set by another routine in a manner described below is input. However, under driving conditions where the air-fuel ratio feedback control is not performed, the air-fuel ratio feedback correction coefficient $\alpha$ is fixed to 1 (or the value at the time of terminal of the precedent air-fuel ratio feedback control).

At step 35, the final fuel injection quantity (fuel feed rate) is computed according to the following formula:

$$T_1 = T_p \cdot \text{TPMET} \cdot \text{COEF} \cdot \alpha + T_s.$$

The fuel in a quantity corresponding to the fuel injection quantity $T_1$ thus computed and set is fed at a predetermined timing to a predetermined cylinder.

Figure 4:
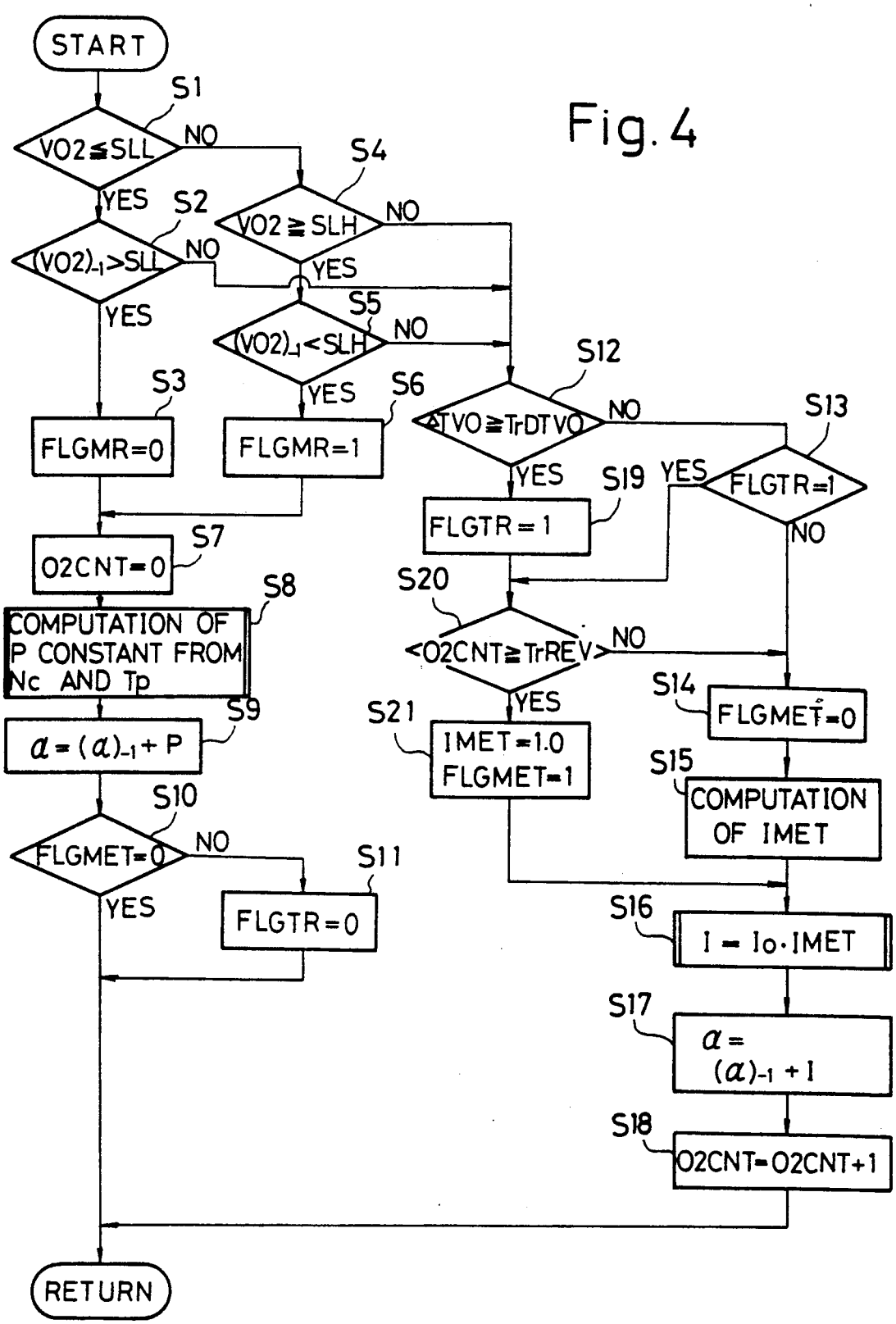
FIG. 4 is a flow chart showing an air-fuel ratio feedback correction coefficient-setting routine in the embodiment shown in FIG. 2.

The routine for setting the air-fuel ratio feedback correction coefficient according to the present invention will now be described with reference to the flow chart of FIG. 4. this routine is worked under predetermined conditions for the feedback control of the air-fuel ratio (determined by the engine revolution speed, the load and the like). This routine corresponds to the air-fuel ratio feedback correction coefficient-setting means.

At step 1, it is judged whether or not a signal voltage $VO_2$ at the $O_2$ sensor 6 is lower than the standard value SLL for judging the lean state of the air-fuel ratio.

When the above signal voltage is judged to be lower, than SLL, the routine goes into step 2, and it is judged whether or not the above signal voltage was judged to exceed the standard value SLL at the precedent judgement (the time of reversal of the signal from the rich state to the lean state).

At the time of the signal reversal, the routine goes into step 3 and a flag FLGMR for the rich/lean state judgement is reset at 0, and the routine goes into step 7.

When it is judged at step 1 that the signal voltage exceeds the standard value SLL, the routine goes into step 4, and it is judged whether or not $VO_2$ is higher than standard value for determining the rich state. The standard value SLH is set at a higher level than the standard value SLL so that a hysteresis is observed in the judgement of the rich and lean states.

When it is judged that the signal value is larger than SLH, the routine goes into step 5, and it is judged whether or not the signal value was judged to be below the standard value SLH at the precedent judgement (the time of reversal of the signal from the lean state to the rich state). At the time of the signal reversal, the routine goes into step 6, and the rich/lean state-judging flag FLGMR is set at 1 and the routine goes into step 7.

At step 7, a counter 02CNT for measuring the cumulative revolution number of the engine at the reversal of the signal of $O_2$ sensor 6 is reset at 0.

Then, at step 8, the proportion constant P is set based on the value of the flag FLGMR, the engine revolution number and the basic fuel injection quantity Tp. When the routine goes into step 8 through step 3, since the flag FLGMR is set at 0 and the voltage signal is at the time of the reversal to the lean value, the proportion constant P is set at a positive value, but when the routine goes into step 8 through step 6, since the flag FLGMR is set at 1 and the voltage signal is at the time of the reversal to the rich state, the proportion constant P is set at a negative value. Incidentally, the basic fuel injection quantity Tp is set as a value proportional to the quantity of air sucked in the cylinder based on the engine revolution number N and the sucked air flow quantity Q through a routine not shown in the drawings. In view of the control response characteristic, it is preferred that the basic fuel injection quantity Q be corrected by the alcohol concentration, but in the present embodiment, a typical value of the engine load not influenced by the alcohol concentration before the correction (for example, the alcohol or gasoline concentration is 0) is used.

At step 9, the air-fuel ratio feedback correction coefficient α is renewed to a value obtained by addition of the above-mentioned proportion constant P. By this renewal, at the time of the reversal to the jean value, α is increased because the proportion constant P is a positive value, but at the time of the reversal to the rich value, α is decreased because the proportion constant P is a negative value.

At step 10, a flag FLAGMET to be set at 1 when the integration constant is increased at the transient driving to increase the response characteristic of the air-fuel ratio, as described hereinafter, is judged. When it is judged that the flag FLAGMET is set at 1, the routine goes into step 11 and a flag FLGTR for judging the transient state is reset at 0 and then, the routine is ended. When the flag FLAGMET is set at 0, the routine is directly ended.

If the judgement is NO at any of steps 4, 5 and 6, that is, at the time other than the time of the reversal of the signal, the routine goes into step 12 and it is judged whether or not the change ratio ΔTVO of the opening degree of the throttle valve exceeds the standard value TrDTVO for the judgement of the transient driving. The function of this step 12 constitutes the stationary/transient state-judging means.

If the change ratio is lower than the standard value TrDTVO, the routine goes into step 13, and the value of the flag FLGTR to be set at 1 at the judgement of the transient state is judged. At the stationary driving where the flag FLGTR is set at 0, the routine goes into step 14 and the flag FLAGMET is reset at 0, and then, the routine goes into step 15 and the correction coefficient IMET(<1) for correcting the integration constant for setting the air-fuel ratio feedback correction coefficient α according to the alcohol concentration detected by the alcohol sensor 7 is set. Specifically, the correction coefficient IMET is determined by retrieval from a characteristic map formed so that the correction coefficient IMET is decreased with increase of the alcohol concentration. The stationary driving integration constant-setting means is constructed by this characteristic map and the function of this step 15.

Then, the routine goes into step 16 and the integration constant I is set by multiplying the basic integration constant Io, determined by retrieval or the like from a map based on the value of the flag FLGMR, the engine revolution number N and the basic fuel injection quantity Tp, by the above-mentioned correction coefficient IMET. Also in this case, in the rich state where the flag FLGMR is set at 1, the integration constant 1 is set at a negative value, and in the lean state where the flag FLGMR is set at 0, the integration constant I is set at a positive value. The basic integration constant Io is a value set based on the case where 100% gasoline is used. Accordingly, the integration constant I is corrected by the correction coefficient IMET so that the value (absolute value) of the integration constant I is reduced with increase of the alcohol concentration.

At step 17, the air-fuel ratio feedback correction coefficient α is renewed by adding the integration constant I to the precedent value of the air-fuel ratio feedback correction coefficient α.

At step 18, the value of the counter O2CNT for measuring the cumulative revolution number of the engine after the above-mentioned signal reversal is counted up.

When ΔTVO≧TrDTVO is judged at step 12, the routine goes into step 19 and the flag FLGTR is set at 1, and then, the routine goes into step 20 and it is judged whether or not the measured value of the counter O2CNT exceeds the predetermined value TrREV. While the measured value dies not reach the predetermined value, the routine returns to step 14 and the control is continued as in the stationary driving state. After the measured value arrives at the predetermined value, the routine goes into step 21 and the correction coefficient IMET for the integration constant is set at 1, and the flag FLGMET is set at 1, whereby the air-fuel ratio feedback control having a response characteristic enhanced by increasing the integration constant I to a maximum value as in case of gasoline is initiated. The reason why this air-fuel ratio feedback control is initiated after the cumulative engine revolution number reaches the predetermined value TrREV after the detection of the transient driving is that although if the air-fuel ratio feedback control is initiated just after the detection of the transient driving, a delay is caused in maintenance of a stationary state after the transient state because of overshooting, degration of the exhaust characteristics by the deflection of the air-fuel ratio during this delay is prevented by above-mentioned manner of initiating the air-fuel ratio feedback control. Once this air-fuel ratio feedback control having an enhanced response characteristic is initiated, even after ΔTVO≧TrDVO is judged at step 12, while the flag FLGR is set at 1, that is, while the air-fuel ratio feedback correction coefficient α is continued to increase or decrease by the transient driving, the routine goes into step 21 through steps 13 and 20, and the air-fuel ratio feedback control having an enhanced response characteristic is continued.

Incidentally, the functions of step 13 and steps 19 through 21 correspond to the transient driving integration constant-setting means.

Figure 5:
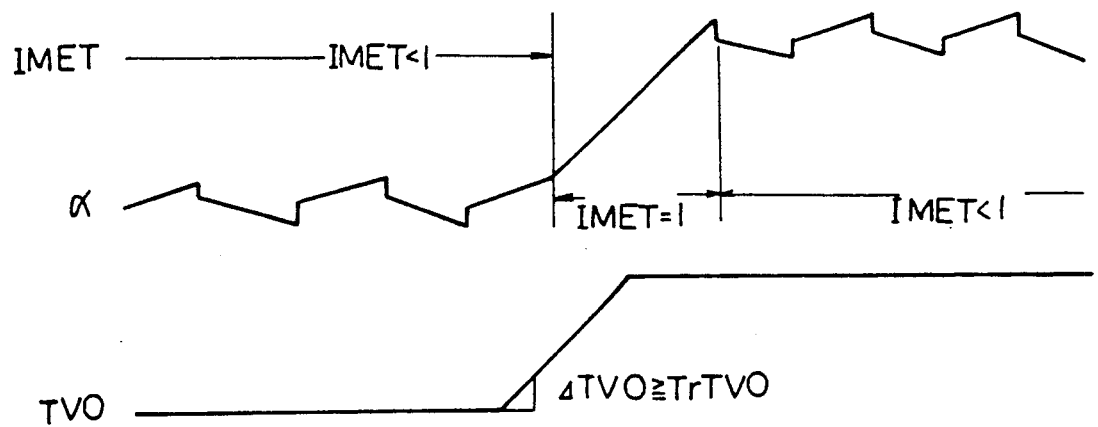
FIG. 5 is a time chart showing state of respective parts when the driving state is changed in the embodiment shown in FIG. 2.

By performing the above-mentioned control, at the air-fuel ratio feedback control in the stationary driving state, the integration constant I is decrease-corrected with increase of the alcohol concentration, and therefore, the deflection of the air-fuel ratio is reduced and increase of the amounts of CO and HC by thickening can be controlled. At the air-fuel ratio feedback control in the transient driving state, the air-fuel ratio having an enhanced characteristic can be performed by using such a large value of the integration constant as in the case where gasoline is used. Also in this case, the exhaust amounts of CO, HC and NOx can be maintained below the standard levels (see FIG. 5).

As is apparent from the foregoing description, according to the present invention, the integration constant at the air-fuel ratio feedback control is set in the stationary state according to the standard fuel concentration and the integration constant in the transient driving state is maintained at an increased value. Accordingly, the air-fuel ratio can be properly controlled without being influenced by the fuel concentration and irrespectively of the stationary and transient driving states, whereby the exhaust amounts of discharged pollutants can be reduced to minimum levels.

INDUSTRIAL APPLICABILITY

As is understood from the foregoing description, the air-fuel ratio control apparatus for an internal combustion engine using different kinds of fuels according to the present invention can enhance exhaust gas-purging characteristics of the internal combustion engine of this type, and is very effective for improving the engine substitutability and the environmental conditions.

What is claimed is:

1. An air-fuel ratio control apparatus in an internal combustion engine using different kinds of fuels, which comprises driving state-detecting means for detecting the driving state of an internal combustion engine where different kinds of fuels are used interchangeably or together in a mixed state, air-fuel ratio-detecting means for detecting the air-fuel ratio of an air-fuel mixture to be fed into the engine, air-fuel ratio feedback correction coefficient-setting means for setting an air-fuel feedback correction coefficient according to the air-fuel ratio detected by the air-fuel ratio-detecting means by a control including an integration constant so that the air-fuel ratio is brought close to a target air-fuel ratio, basic fuel feed rate-setting means for setting a basic fuel feed rate according to the driving state of the engine detected by the driving state-detecting means fuel feed rate-setting means for setting a fuel feed rate corresponding to the target air-fuel ratio by correcting the basic fuel feed rate set by the basic fuel feed rate-setting means according to the air-fuel ratio feedback correction coefficient set by the air-fuel ratio feedback correction coefficient, fuel-feeding means for feeding a fuel to the engine according to the set feed rate, and a ternary catalyst disposed in an exhaust path of the engine to purge pollutants in an exhaust gas by oxidation reaction and reduction reaction, said air-fuel ratio apparatus being characterized by further comprising fuel concentration-detecting means for detecting the concentration of a basic fuel in the used fuels, stationary/transient state-judging means for judging a stationary driving state or transient driving state of the engine based on the driving state detected by the driving state-detecting means, stationary driving integration constant-setting means for setting the integration constant according to the fuel concentration detected by the fuel concentration-detecting means when a stationary driving state judged by the stationary/transient state-judging means, and transient driving integration constant-setting means for setting the integration constant at a value larger than the value set by the stationary driving integration constant-setting means when a transient driving state is judged by the stationary/transient state-judging means.

2. An air-fuel ratio control apparatus for an internal combustion engine using different kinds of fuels according to claim 1, where in the different kinds of fuels are gasoline and an alcohol.

3. An air-fuel ratio control apparatus for an internal combustion engine using different kinds of fuels according to claim 1, the driving state-detecting means detected a driving state including the revolution speed and load of the engine.

4. An air-fuel ratio control apparatus for an internal combustion engine using different kinds of fuels according to claim 1, wherein the air-fuel ratio-detecting means defects the air-fuel ratio by detecting the oxygen concentration in an exhaust gas of the engine.

5. An air-fuel ratio control apparatus for an internal combustion engine using different kinds of fuels according to claim 1, wherein the air-fuel ratio feedback correction coefficient-setting means is constructed so that the air-fuel ratio feedback correction coefficient is et according to the air-fuel ratio under predetermined driving conditions detected by the driving state-detecting means, and in other driving states, the air-fuel ratio feedback correction coefficient is fixed and the air fuel ratio feedback control is stopped.

6. An air-fuel ratio control apparatus for an internal combustion engine using different kinds of fuels according to claim 1, wherein the air-fuel ratio feedback correction coefficient-setting means sets the air-fuel ratio feedback correction coefficient by proportion-integration control using a proportion constant and an integration constant.

7. An air-fuel ratio control apparatus for an internal combustion engine using different kinds of fuels according to claim 6, wherein the air-fuel ratio feedback correction coefficient-setting means corrects the basic value, set based on the driving state detected by the driving state-detecting means with respect to the proportion constant, by the fuel concentration.

8. An air-fuel ratio control apparatus for an internal combustion engine using different kinds of fuels according to claim 1, wherein the basic fuel feed rate-setting means corrects the basic fuel feed rate according to the fuel concentration detected by the fuel concentration-detecting means.

9. An air-fuel ratio control apparatus for an internal combustion engine using different kinds of fuels according to claim 2, wherein the fuel concentration-detecting means detects the alcohol concentration.

10. An air-fuel ratio control apparatus for an internal combustion engine using different kinds of fuels according to claim 1, wherein the stationary/transient state-judging means judges the stationary driving state and the transient driving state according to driving conditions the change ratio of the opening degree of a throttle valve.

11. An air-fuel ratio control apparatus for an internal combustion engine using different kinds of fuels according to claim 10, wherein the stationary/transient state-judging means is constructed so that when the cumulative revolution number of the engine arrives at a predetermined level after the change ratio of the opening degree of the throttle valve has exceeded a predetermined value, the judgement is switched over from the judgement of the stationary driving state to the judgement of the transient driving state.

12. An air-fuel ratio control apparatus for an internal combustion engine using different kinds of fuels according to claim 1, wherein the judgement of the transient driving state is continued until increase or decrease of the air-fuel ratio feedback correction coefficient is reversed after the start of the judgement of the transient driving state.

13. An air-fuel ratio control apparatus for an internal combustion engine using different kinds of fuels according to claim 1, wherein the stationary driving integration constant-setting means corrects the basic value, set based on the driving state detected by the driving state-detecting means, by the fuel concentration.

* * * * *